United States Patent
Rodriguez

(10) Patent No.: US 12,237,995 B1
(45) Date of Patent: Feb. 25, 2025

(54) SYSTEMS AND METHODS FOR NETWORK COMPATIBILITY

(71) Applicant: Tassat Group Inc., New York, NY (US)

(72) Inventor: Ralph Rodriguez, New York, NY (US)

(73) Assignee: Tassat Group Inc., New York, NY (US)

( * ) Notice: Subject to any disclaimer, the term of this patent is extended or adjusted under 35 U.S.C. 154(b) by 0 days.

(21) Appl. No.: 18/733,519

(22) Filed: Jun. 4, 2024

(51) Int. Cl.
*H04L 45/00* (2022.01)
*G06Q 20/02* (2012.01)

(52) U.S. Cl.
CPC ............. *H04L 45/22* (2013.01); *G06Q 20/02* (2013.01)

(58) Field of Classification Search
None
See application file for complete search history.

(56) References Cited

U.S. PATENT DOCUMENTS

| | | | | |
|---|---|---|---|---|
| 2009/0210504 | A1* | 8/2009 | Shuster | H04L 51/04 709/206 |
| 2015/0106665 | A1* | 4/2015 | Choh | H04L 51/08 714/57 |
| 2016/0043945 | A1* | 2/2016 | Cooper | H04L 45/34 370/389 |
| 2016/0065691 | A1* | 3/2016 | Ramnathkar | H04L 69/22 709/238 |
| 2016/0149848 | A1* | 5/2016 | Vembu | H04L 51/08 709/206 |
| 2019/0385057 | A1* | 12/2019 | Litichever | H04L 63/14 |

* cited by examiner

*Primary Examiner* — Mohamed Ibrahim
(74) *Attorney, Agent, or Firm* — GREENBERG TRAURIG, LLP

(57) ABSTRACT

Systems and methods of the present disclosure include steps for automated modifications to network routing data in electronic communications. The steps include receiving an electronic request message having a routing code field with routing code field content defining a portion of a routing path, and a destination code field with destination code field content defining a destination of the electronic request message. The steps include determining that the destination code field content conforms to a first network protocol. The steps further include accessing a dynamic route map and determining a second network protocol destination code of a second network protocol associated with the destination based on the dynamic route map and the first network protocol destination code. The steps further include modifying the routing code field content to include the second network protocol destination code and routing the electronic request message according to the second network protocol destination code.

20 Claims, 8 Drawing Sheets

SYSTEMS AND METHODS FOR NETWORK COMPATIBILITY

FIELD OF TECHNOLOGY

The present disclosure generally relates to computer-based systems and/or methods configured for network compatibility, including automated electronic request message error detection and/or correction for network communication addressing and routing to resolve incomplete addressing data.

BACKGROUND OF TECHNOLOGY

Electronic request messages are typically routed through a network based on addressing in the electronic request messages. A destination address specifies where on the network the destination of an electronic request message can be found, and, in some cases, the source address from which the electronic request message is sent. The format or protocol of the network involved may define the addressing scheme and what data is to be included in each electronic communication. For example, a message across the Internet is sent to a destination using an Internet protocol (IP) address.

SUMMARY OF DESCRIBED SUBJECT MATTER

In some aspects, the techniques described herein relate to a system including: receiving, by at least one processor, at least one electronic request message; wherein the at least one electronic request message includes: at least one routing code field having at least one routing code field content defining at least one portion of a routing path of the at least one electronic request message and at least one destination code field having at least one destination code field content defining at least one destination of the at least one electronic request message; determining, by the at least one processor, that at least one first network protocol destination code in the at least one destination code field content conforms to a first network protocol associated with a first network; accessing, by the at least one processor, a dynamic route map stored in a mapping database; wherein the dynamic route map includes a mapping of destination codes between the first network protocol and a second network protocol; determining, by the at least one processor, at least one second network protocol destination code associated with the at least one first network protocol destination code based at least in part on the dynamic route map and the at least one first network protocol destination code; wherein the at least one second network protocol destination code conforms to the second network protocol of the second network to define the at least one destination of the at least one electronic request message; modifying, by the at least one processor, the at least one routing code field content of the at least one routing code field of the at least one electronic request message to include the at least one second network protocol destination code; and routing, by the at least one processor, the at least one electronic request message according to the at least one second network protocol destination code in the at least one routing code field content of the at least one routing code field.

In some aspects, the techniques described herein relate to a method, further including: automatically mapping, by the at least one processor, destination codes for each destination across at least one of the first network and the second network; and updating, by the at least one processor, the dynamic network map based at least in part on the mapping of the destination codes.

In some aspects, the techniques described herein relate to a method, further including: determining, by the at least one processor, the at least one first network protocol destination code associated with a first entity name; determining, by the at least one processor, the at least one second network protocol destination code associated with a second entity name; determining, by the at least one processor, that the first entity name and the second entity name match; and generating, by the at least one processor, in the dynamic route map, a mapping between the at least one first network protocol destination code and the at least one second network protocol destination code.

In some aspects, the techniques described herein relate to a method, further including: determining, by the at least one processor, utilizing at least one similarity measure, a similarity measurement between the first entity name and the second entity name; determining, by the at least one processor, that the similarity measurement exceeds a predetermined threshold; and determining, by the at least one processor, based on the similarity measurement exceeding the predetermined threshold, that the first entity name and the second entity name match.

In some aspects, the techniques described herein relate to a method, further including: executing, by the at least one processor, at least one blockchain transaction on a blockchain between a first user and a second user; wherein the at least one blockchain transaction includes at least one blockchain parameter; generating, by the at least one processor, the at least one electronic request message based at least in part on the at least one blockchain parameters.

In some aspects, the techniques described herein relate to a method, wherein the at least one electronic request message includes at least one electronic transaction request configured to cause at least one transaction corresponding to the at least one blockchain transaction.

In some aspects, the techniques described herein relate to a method, wherein the at least one electronic transaction request includes at least one electronic wire request configured to execute, via Fedwire, the at least one transaction.

In some aspects, the techniques described herein relate to a method, wherein the second network protocol includes ABA and the second network includes Fedwire.

In some aspects, the techniques described herein relate to a method, wherein the first network protocol includes at least one of a Swift routing number or a BIC routing number or both and the second network includes at least one of Swift or BIC or both.

In some aspects, the techniques described herein relate to a method, wherein the at least one electronic request message includes at least one interbank settlement request message.

In some aspects, the techniques described herein relate to a system including: at least one processor configured to: receive at least one electronic request message; wherein the at least one electronic request message includes: at least one routing code field having at least one routing code field content defining at least one portion of a routing path of the at least one electronic request message and at least one destination code field having at least one destination code field content defining at least one destination of the at least one electronic request message; determine that at least one first network protocol destination code in the at least one destination code field content conforms to a first network protocol associated with a first network; access a dynamic route map stored in a mapping database; wherein the dynamic route map includes a mapping of destination codes between the first network protocol and a second network protocol; determine at least one second network protocol destination code associated with the at least one first network protocol destination code based at least in part on the dynamic route map and the at least one first network protocol destination code; wherein the at least one second network protocol destination code conforms to the second network protocol of the second network to define the at least one destination of the at least one electronic request message; modify the at least one routing code field content of the at least one routing code field of the at least one electronic request message to include the at least one second network protocol destination code; and route the at least one electronic request message according to the at least one second network protocol destination code in the at least one routing code field content of the at least one routing code field.

In some aspects, the techniques described herein relate to a system, wherein the at least one processor is further configured to: automatically map destination codes for each destination across at least one of the first network and the second network; and update the dynamic network map based at least in part on the mapping of the destination codes.

In some aspects, the techniques described herein relate to a system, wherein the at least one processor is further configured to: determine the at least one first network protocol destination code associated with a first entity name; determine the at least one second network protocol destination code associated with a second entity name; determine that the first entity name and the second entity name match; and generate in the dynamic route map, a mapping between the at least one first network protocol destination code and the at least one second network protocol destination code.

In some aspects, the techniques described herein relate to a system, wherein the at least one processor is further configured to: determine utilizing at least one similarity measure, a similarity measurement between the first entity name and the second entity name; determine that the similarity measurement exceeds a predetermined threshold; and determine based on the similarity measurement exceeding the predetermined threshold, that the first entity name and the second entity name match.

In some aspects, the techniques described herein relate to a system, wherein the at least one processor is further configured to: execute at least one blockchain transaction on a blockchain between a first user and a second user; wherein the at least one blockchain transaction includes at least one blockchain parameter; generate the at least one electronic request message based at least in part on the at least one blockchain parameters.

In some aspects, the techniques described herein relate to a system, wherein the at least one electronic request message includes at least one electronic transaction request configured to cause at least one transaction corresponding to the at least one blockchain transaction.

In some aspects, the techniques described herein relate to a system, wherein the at least one electronic transaction request includes at least one electronic wire request configured to execute, via Fedwire, the at least one transaction.

In some aspects, the techniques described herein relate to a system, wherein the second network protocol includes ABA and the second network includes Fedwire.

In some aspects, the techniques described herein relate to a system, wherein the first network protocol includes at least one of a Swift routing number or a BIC routing number or both and the second network includes at least one of Swift or BIC or both.

In some aspects, the techniques described herein relate to a system, wherein the at least one electronic request message includes at least one interbank settlement request message.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of improved network compatibility via error detection and correction in externally bound electronic request messages. The following embodiments provide technical solutions and technical improvements that overcome technical problems, drawbacks and/or deficiencies in the technical fields involving the sending and receipt of electronic request messages between different networks having different addressing schemes that results in failed, inefficiently or incorrectly routed electronic request messages. As explained in more detail, below, technical solutions and technical improvements herein include aspects of improved error detection and/or correction in the addressing of electronic communications by proactively restructuring and/or modifying addressing data. Based on such technical features, further technical benefits become available to users and operators of these systems and methods. Moreover, various practical applications of the disclosed technology are also described, which provide further practical benefits to users and operators that are also new and useful improvements in the art.

Figure 1:
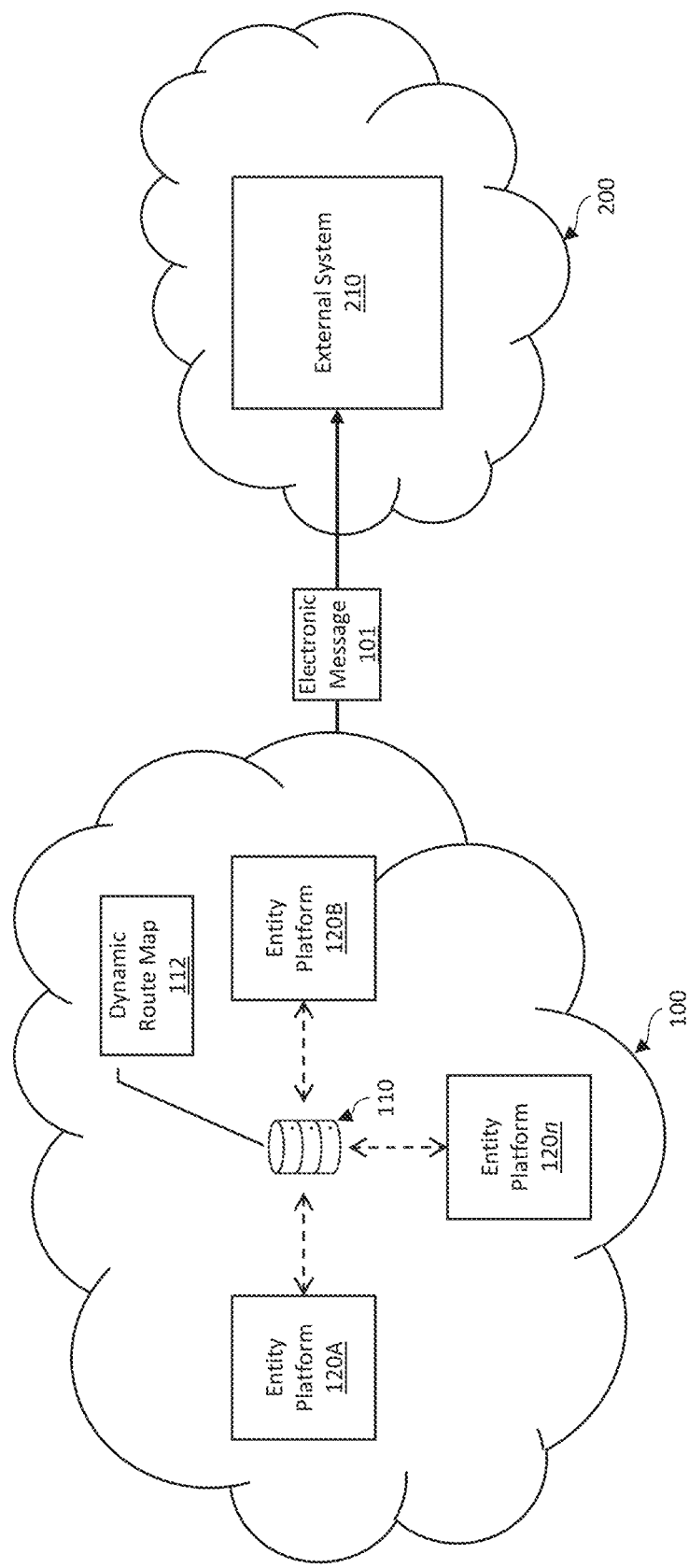
FIG. 1 depicts a network of entity platforms configured to dynamic message modification for reliable and secure electronic request messages to external network(s) in accordance with one or more embodiments of the present disclosure.

Referring now to FIG. 1, a network of entity platforms configured to dynamic message modification is depicted for reliable and secure electronic request messages to external network(s) in accordance with one or more embodiments of the present disclosure.

In some embodiments, one or more entity platforms 120A, 120B through 120n may be a part of a network 100. Accordingly, communication within and between the entity platforms 120A through 120n may be performed based on the messaging protocol associated with the network 100. However, when sending electronic request messages 101 to an external system 210 via an external network 200, the messaging protocol may no longer apply. Thus, errors in the addressing of an electronic request message 101 to the external network may be detected and corrected to ensure accurate routing and secure messaging. The term "error" refers to missing, incorrect, incomplete, outdated, non-optimized or otherwise providing reduced routing/addressing information of electronic messages via a deficiency of the data. The deficiency may include deficiencies that may cause the electronic request message to be inoperable or unable to be sent and/or received, or may include deficiencies that represent opportunities to improve or optimize the addressing, routing and/or data carrying of the electronic request message. Thus, embodiment of the present disclosure relate to modifying the data of an electronic request message to improve, correct, optimize, or otherwise augment the addressing and/or routing of the electronic request message with different and/or additional data in one or more addressing fields for improved routing.

In some embodiments, the network 100 and/or the external network 200 may include any suitable computer network, including, two or more computers that are connected with one another for the purpose of communicating data electronically. In some embodiments, the network 100 and/or the external network 200 may include a suitable network type, such as, e.g., a public switched telephone network (PTSN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet.

In some embodiments, the electronic request messages 101 may each include message data and/or content data representing message related information. In some embodiments, the message data may include source data associated with a source of the message, destination data associated with a destination of each electronic request message 101, a date, a time, a data size, among other related data and metadata for each electronic request message 101.

In some embodiments, the message data may include the source data regarding a sender and/or sending computing device. For example, source data may include, e.g., a computing device type (e.g., smartphone, tablet, laptop computer, smartwatch, or other computing device), sender data such as a sender identifier (e.g., email address, host server address, user account, name, company or organization name, etc.), among other data and combinations thereof.

In some embodiments, the message data may include the destination data regarding a recipient and/or receiving computing device such as a user device and/or the associated entity platform 120A through 120n. For example, destination data may include, e.g., a computing device type (e.g., smartphone, tablet, laptop computer, smartwatch, or other computing device), recipient data such as a recipient identifier (e.g., email address, host server address, user account, name, company or organization name, etc.), among other data and combinations thereof.

In some embodiments, the content data may include data and metadata representing the content of each electronic request message 101. In some embodiments, the electronic request messages 101 may include text content, images (e.g., JPG, EXIF, TIFF, BMP, WebP, GIF, HEIF, PNG, etc.), formatting of text and/or images, interactive media (e.g., videos formatted as, e.g., MP4, MOV, WMV, FLV, AVI, AVCHD, WebM, MKV, VP9, etc.), Javascript or other software script elements, Emoji, hyperlinks, attached documents (such as documents provided in a formation including, e.g., PDF, DOC, DOCX, XLS, XLSX, PPT, PPTX, ODF, HTML/CSS, XML, etc.) among other message contents or any combination thereof. In some embodiments, the content data may include data representing the content as well as formatting, layout, size, or other content metadata or any combination thereof.

In some embodiments, the electronic request messages 101 may each be associated with instructing, authorizing and/or recording at least one electronic activity, such as a credit card transaction authorization request, an electronic transaction, an account transfer, a FedWire transfer, a SWIFT transfer, or other electronic activity or any combination thereof. In some embodiments, an electronic activity may be associated with message data including, e.g., a user identifier associated with each data entry, a third-party entity identifier associated with each data entry, an activity type identifier, an activity value or activity quantity, a time data item, a location data item, a date data item, a device type or device identifier associated with an electronic activity execution device, an activity description, or other attributes representing characteristics of each data entry.

For example, in some embodiments, the electronic activity data entry may include a transaction-related activity, such as a transaction record (e.g., transaction authorization request, posted transaction, etc.). In such an example, the data items may include, e.g., a transaction value, a transaction type, an account identifier or a user identifier or both, a merchant identifier, a transaction authorization date, a transaction post date, a transaction location, an execution device (e.g., point-of-sale device, Internet payment, etc.) among other transaction data and combinations thereof.

In some embodiments, each entity platform 120A through 120n may include, e.g., a computer device and/or computer system formed of one or more hardware and/or software components.

In some embodiments, a computer device may include at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the computer system of an entity platform 120A through 120n may include one or more servers. In some embodiments, a server may refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, cloud servers may include at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

In some embodiments, the database 110 may include, e.g., an organized collection of data, stored, accessed or both electronically from a computer system. The database may include a database model formed by one or more formal design and modeling techniques. The database model may include, e.g., a navigational database, a hierarchical database, a network database, a graph database, an object database, a relational database, an object-relational database, an entity-relationship database, an enhanced entity-relationship database, a document database, an entity-attribute-value database, a star schema database, or any other suitable database model and combinations thereof. For example, the database may include database technology such as, e.g., a centralized or distributed database, cloud storage platform, decentralized system, server or server system, among other storage systems. In some embodiments, the database may, additionally or alternatively, include one or more data storage devices such as, e.g., a hard drive, solid-state drive, flash drive, or other suitable storage device. In some embodiments, the database may, additionally or alternatively, include one or more temporary storage devices such as, e.g., a random-access memory, cache, buffer, or other suitable memory device, or any other data storage solution and combinations thereof.

Depending on the database model, one or more database query languages may be employed to retrieve data from the database. Examples of database query languages may include: JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages.

The database may include one or more software, one or more hardware, or a combination of one or more software and one or more hardware components forming a database management system (DBMS) that interacts with users, applications, and the database itself to capture and analyze the data. The DBMS software additionally encompasses the core facilities provided to administer the database. The combination of the database, the DBMS and the associated applications may be referred to as a "database system".

In some embodiments, each entity platform 120A through 120n may be configured to access the database 110 to retrieve the dynamic route map 112. In some embodiments, each entity platform 120A through 120n, upon sending an electronic request message, may test the electronic request message for addressing data that defines the routing to a destination, e.g., associated with the external system 210. In some embodiments, the entity platform 120A through 120n may analyze the electronic request message using an error detection component and the dynamic route map 112 in the database 110. Thus, the entity platform 120A through 120n may use the error detection component to analyze, e.g., the message data of the electronic request message 101, such as, e.g., addressing data and/or routing data, to determine whether the electronic request message 101 is likely to have an error in routing to the destination. The entity platform 120A through 120n may then query the database 110 to access the dynamic routing map 112 to generate a modification to the message data such as to correct and/or enrich the addressing/routing data, thus improving the reliability of the transmission of electronic request messages 101. In some embodiments, the error detection and error correction may detect and correct addressing and/or routing deficiencies in the electronic request messages 101, including both unintentional (e.g., erroneously specified message data) and intentional (e.g., fraudulent message) errors in the message data. Thus, the entity platform 120A through 120n may use the dynamic route map 112 to improve both the reliability and the security of inter-network communications.

Figure 2:
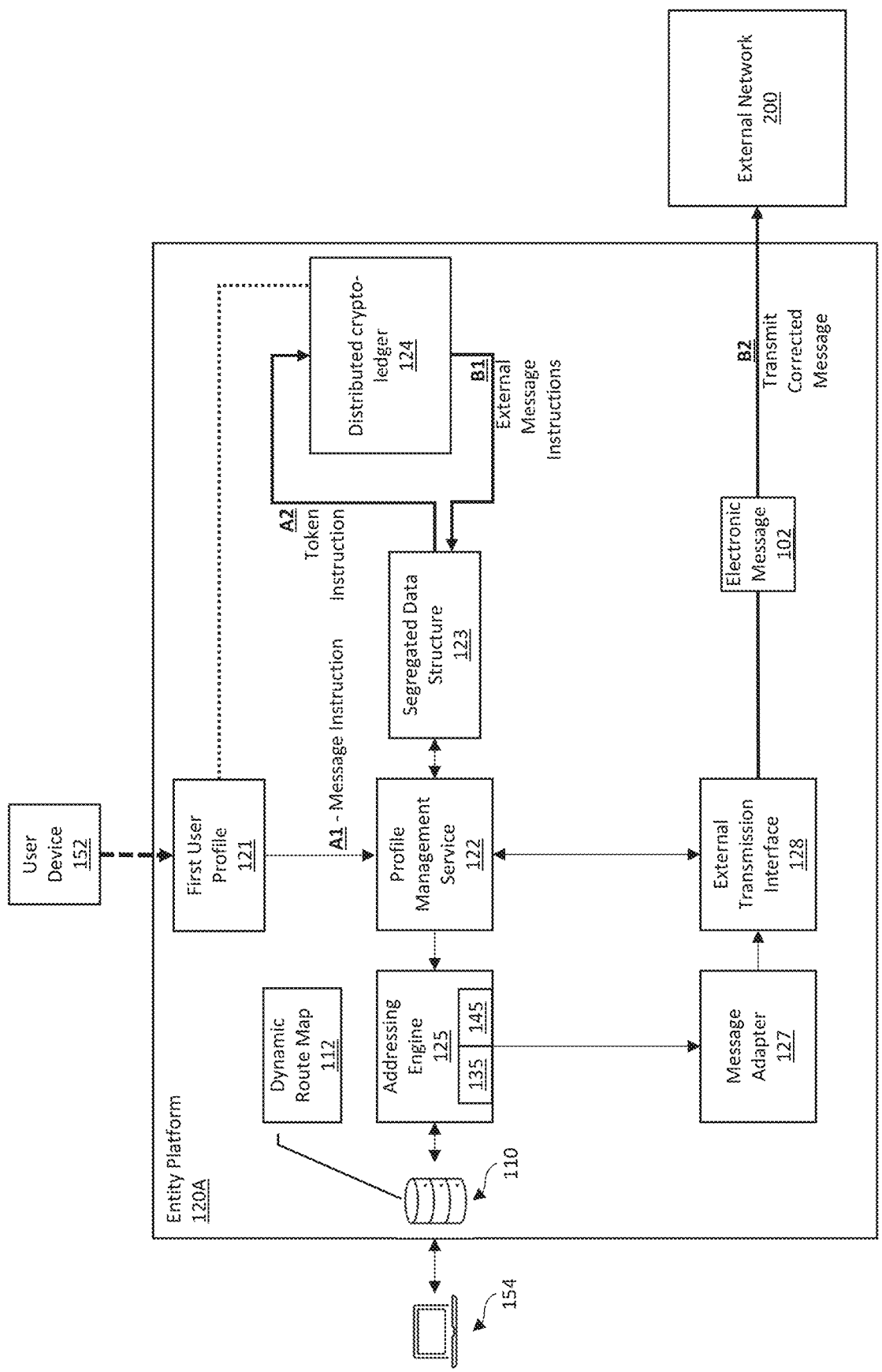
FIG. 2 depicts an entity platform configured to dynamic message modification for reliable and secure electronic request messages to external network(s) in accordance with one or more embodiments of the present disclosure.
Figure 3:
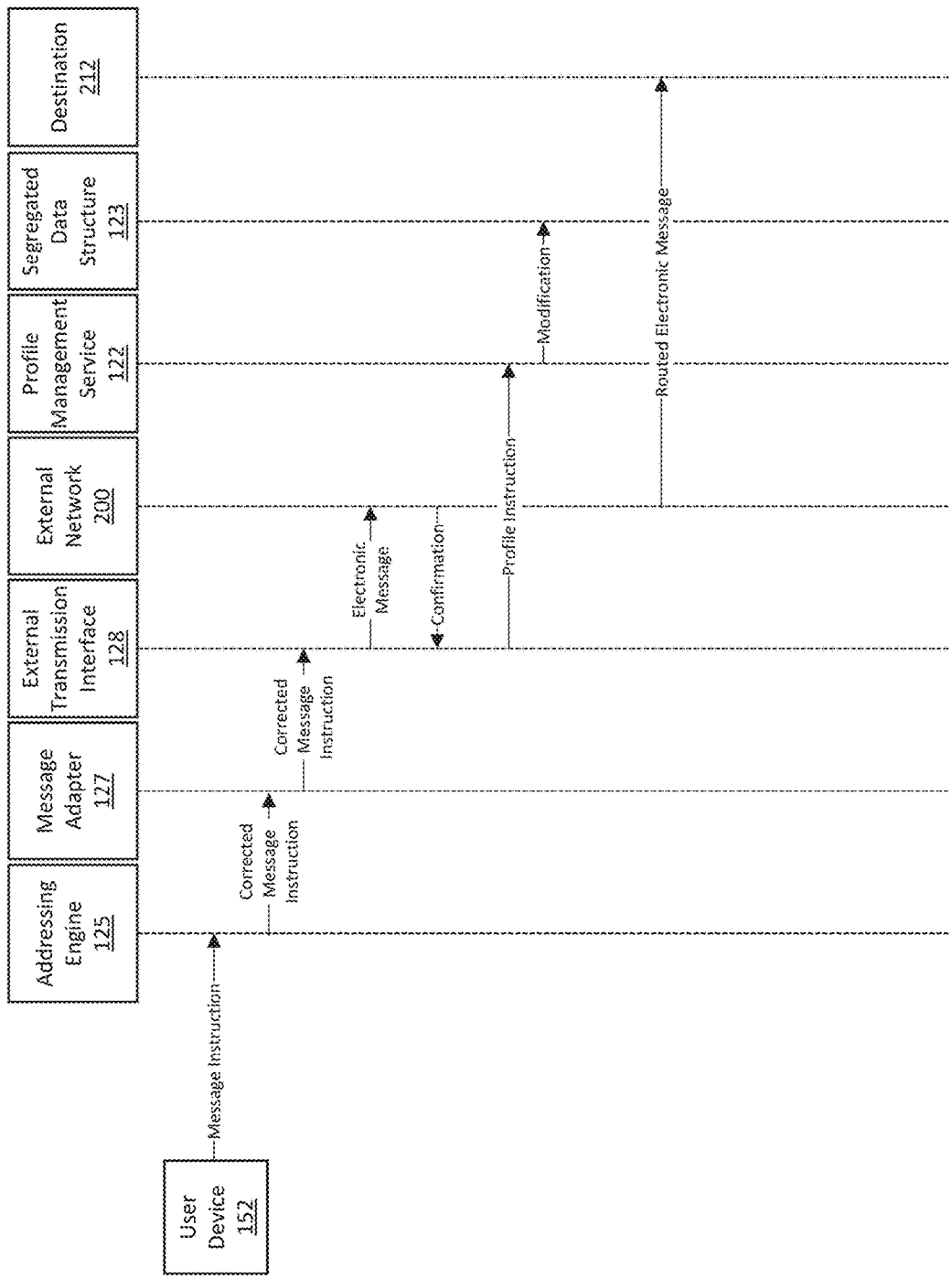
FIG. 3 depicts a messaging architecture in the entity platform for dynamic message modification for reliable and secure electronic request messages to external network(s) in accordance with one or more embodiments of the present disclosure.

Referring now to FIGS. 2 and 3, FIG. 2 shows an entity platform configured for dynamic message modification for reliable and secure electronic request messages to external network(s) in accordance with one or more embodiments of the present disclosure. FIG. 3 shows a messaging architecture in the entity platform for dynamic message modification for reliable and secure electronic request messages to external network(s) in accordance with one or more embodiments of the present disclosure.

In some embodiments, a user may desire to send a digital asset to a destination. Accordingly, the user may employ a user device 152 to instruct an entity platform 120A to transmit the digital asset in an electronic request message to the destination. To do so, the user device 152 may present a user interface having one or more user selectable options and/or user input fields that enable the user to input message instruction parameters define the message data and/or content data, including the destination and/or the digital asset.

In some embodiments, the user interface may be associated with a first user profile 121 associated with the user. Accordingly, in some embodiments, a profile management service 122 may receive the message instruction parameters, from the user device 152, from the first user profile 121 or a combination thereof. In some embodiments, the message instruction A1 triggers a profile management service 122 to initiate a distributed crypto-ledger-based messaging procedure, including a token instruction A2 on a distributed crypto-ledger 124, and/or an external message transmission process B to transmit an electronic request message 102 to the external network 200.

In some embodiments, the profile management service 122 may utilize a segregated data structure 123 to segregate the digital asset from the first user profile 121. Doing so may facilitate tokenization on the distributed crypto-ledger 124. In some embodiments, the digital asset may be tokenized prior to segregation in the segregated data structure 123.

In some embodiments, the segregated data structure 123 may include a database schema configured for storing and/or recording assets and asset quantities segregated from the entity of the associated entity platform 120A through 120n and destined for a recipient in an asset transfer or transmission. The database schema may include a customized, e.g., navigational database, hierarchical database, network database, graph database, object database, relational database, object-relational database, entity-relationship database, enhanced entity-relationship database, document database, entity-attribute-value database, star schema database, or any other suitable database schema customized and configured for storing and/or recording assets and asset quantities segregated from the entity of the associated entity platform 120A through 120n and combinations thereof. For example, the database may include database technology such as, e.g., a centralized or distributed database, cloud storage platform, decentralized system, server, or server system, among other storage systems.

In some embodiments, the first user may desire to send a message to a second user. Accordingly, the first user may initiate the message instruction A1 at process A to initiate the message transmission by selecting and/or inputting, via a user interface of a user device 152, user defined parameters defining the message from the first user profile 121 of the first user to a destination, e.g., on the external network 200.

In some embodiments, the user device 152 may include or be incorporated, partially or entirely, into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, in response to the user input and/or selection, the user device 152 may communicate the user defined parameters, e.g., using key-value pairs, structured table or list or vector or array, or any combination thereof, to the entity platform 120A, to a separate application layer and/or application server, or to any other suitable computing system.

In some embodiments, the computing system may receive the user defined parameters and generate a message instruction having instruction parameters derived from the user-defined parameters, including, e.g., message data (e.g., a destination address and/or routing data) and/or content data, such as a digital asset to be delivered. In some embodiments, the instruction parameters may include a sender network address and recipient network address associated with the entity platform 120A and the external network 200, respectively. In some embodiments, the sender and recipient addresses may be for the entity platform 120A and the external system 210, respectively, and/or for the first segregated data structure 123 and a second segregated data structure.

In some embodiments, a distributed crypto-ledger 124 may receive the message instruction, including the message instruction parameters. In some embodiments, the message instruction and the message instruction parameters may be associated with an instruction to transfer the digital asset from the first user to the destination (e.g., a second user associated with the external network 200).

In some embodiments, based on the instruction parameters, the entity platform 120A, e.g., as instructed by the distributed crypto-ledger 124 and/or a controller of the entity platform 120A, may move the quantity of the asset of the transfer from the first user profile 121 to the first segregated data structure 123. In some embodiments, moving the quantity of the asset into the first segregated data structure 123 moves the quantity of the asset from a data structure associated with the user to a data structure associated with the distributed crypto-ledger 124. Thus, the quantity of the asset is segregated from the user of the entity platform 120A.

In some embodiments, the distributed crypto-ledger 124 may verify the presence of the quantity of the asset in the first segregated data structure 123 in order to ensure a transfer of a token representing a tokenization of the quantity of the asset may be performed across the distributed crypto-ledger 124. Moreover, because the first segregated data structure 123 is a node of the distributed crypto-ledger 124, the first segregated data structure 123 may verify the transfer instruction by verifying the quantity of the first asset, and trigger the distributed crypto-ledger 124 to generate, at step A2, a token instruction configured to cause a transfer of the digital asset from the user based on the message instruction parameters.

In some embodiments, the user profile 121 may be associated with a cryptographic token storage on the distributed crypto-ledger 124. In some embodiments, the token instruction A2 may cause the distributed crypto-ledger 124 to move the tokens from the cryptographic token storage to a different cryptographic token storage, and/or to burn the tokens from the distributed crypto-ledger 124 in order to immutably record the transfer of the digital asset. In some embodiments, cryptographic token storage may include, e.g., a blockchain wallet, or any other suitable cryptographic storage location addressed on the distributed crypto-ledger 124.

In some embodiments, the exemplary distributed crypto-ledger 124 may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize self-executing programming objects, e.g., smart contracts, that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, the operation may include a transfer of data, such as, e.g., an internet message communication, an SMS/MMS/RCS message, a file transfer, an electronic financial transfer (e.g., a money wire via, e.g., ACH or FedWire, etc.), among other transfers. Accordingly, the entity platform 120A may use the distributed crypto-ledger 124 to perform parallel transfers of tokenizations of the data for secure, immutable, and real-time transfer between the entity platform 120A.

In some embodiments, the distributed crypto-ledger 124 allows users of a member entity to send confirmed real-time data to users of other member entities. The distributed crypto-ledger 124 may convey the data via a tokens or tokenized data representing the data between the member entities. For example, for payment operations, the distributed crypto-ledger 124 may use tokens representing currency, such as, e.g., any suitable crypto-tokens, including bitcoin, Ether, Dogecoin, a stablecoin, or other suitable crypto-token or any suitable combination thereof.

Upon transferring the tokens and/or tokenized data between the member entities, the transfer of the original data may be reconciled with the transfer of the tokens and/or tokenized data to verify the completion and integrity of the operation.

In some embodiments, where the operation is a financial monetary transfer, the transfer of the original data may include a physical and/or digital transfer of the currency. Reconciliation of the transfer of the tokens and/or tokenized data and the transfer of the currency may take the form of settlement via one or more traditional payment rails, e.g., via FedWire, SWIFT, ACH, etc. The traditional payment rails may be a slow, computationally expensive, and financially expensive such that each operation cannot be feasibly performed in real-time. Thus, distributed crypto-ledger 124 provides the real-time transfer which may then be settled after the fact with the transfer of the currency. Accordingly, the transfer of the currency may be performed at any suitable time after the real-time transfer of tokens representing the currency. As a result, currency transfers may be batched based on aggregated amounts between entities to consolidate many transfers into one operation over the network between the entity platform 120A.

In some embodiments, the distributed crypto-ledger 124 may convey payment instructions between member entities for currency settlement (e.g., US Dollar settlement, or other currency or combination of currencies) between member entities may be performed over FedWire or other suitable wiring service. In some embodiments, the distributed crypto-ledger 124 the distributed crypto-ledger 124 utilizes a private permissioned blockchain. In some embodiments, the distributed crypto-ledger 124 may issue payment instructions and may utilize tokens that include or do not include stablecoins. In some embodiments, the distributed crypto-ledger 124 permits permissioned self-executing programming objects, such as, e.g., smart contracts, and documentation to be attached to the instructions. In some embodiments, the distributed crypto-ledger 124 architecture allows third parties to develop permissioned applications (e.g., for vertical markets, healthcare, receivables, mortgages, trade) that benefit from utilizing the distributed crypto-ledger 124 infrastructure.

In some embodiments, access to the distributed crypto-ledger 124 is limited to regulated member entities. Thus, in some embodiments, every member entity on the distributed crypto-ledger 124 is approved by an administrator or group of administrators (such as a Board of Directors) of the distributed crypto-ledger 124 and is subject to the governance requirements set by the distributed crypto-ledger 124. In some embodiments, every member entity may be required to meet all requirements set by the distributed crypto-ledger 124, e.g., regulatory compliance, solvency, transparency, KYC, etc. Additionally, in some embodiments, the distributed crypto-ledger 124 will be able to provide Regulators with access to all necessary data for transparency, compliance and regulatory purpose as requested and agreed by the distributed crypto-ledger 124 and regulators.

In some embodiments, the regulators may be provided with transparency into the distributed crypto-ledger 124 operations as well as operations between the entity platform 120A. Thus, regulators are provided with total transparency on all transactions as well as the tokens in the distributed crypto-ledger 124 systems, and the assets (e.g., funds) held in the digital inter-entity distributed crypto-ledger 124 segregated accounts ("segregated accounts") across member entities and associated entity platform 120A of the distributed crypto-ledger 124. Accordingly, permissions on the distributed crypto-ledger 124 may include requirements of member entities regarding the regulators, such as being in good standing with applicable regulators, submitting to oversight of the requirements for all member entities, including KYC/AML policies, procedures and protocols, ensuring minimum KYC requirements are provided through parameters defined by the administrators of the distributed crypto-ledger 124 and the regulators, among other requirements or any combination thereof.

In some embodiments, a user may trigger a message instruction, such as a payment instruction, message instruction, data message instruction, etc. The message instruction may be originated through a member entity's core system (e.g., FIS, Fiserv), or through an approved and permissioned platform, including an approved and permissioned payments platform or other platform for performing transfers. In some embodiments, the profile management service 122 may generate the electronic request message according to the message instruction parameters of the message instruction and the content data associated therewith.

In some embodiments, the profile management service 122 may provide the message instruction parameters to an addressing engine 125. In some embodiments, the addressing engine 125 may structure and address an electronic request message based on the message instruction parameters. As detailed above, the message instruction parameters may specify message data and/or content data associated with an electronic request message to be sent. In some embodiments, the message data may include addressing data, including an address associated with a destination of the electronic request message. Where the destination is on the external network 200, the associated addressing data may use a different addressing scheme than the addressing scheme of the network 100. Accordingly, the addressing data may include one or more errors associated with erroneous, incomplete, outdated, non-optimized, sparse or otherwise deficient information where a modification to such information may improve the reliability, speed, efficiency, etc. of the electronic request message, such as through reduced routing hops, reduced manual checks and/or error flags enroute, improved accuracy in reaching the intended destination, among other improvements or any combination thereof.

To resolve deficient addressing data, the addressing engine 125 may employ an error detection engine 135. In some embodiments, the structure of the electronic request message may include one or more address fields, such as, e.g., a routing number, an intermediary identifier (ID), a destination ID, among others or any combination thereof. In some embodiments, the error detection engine 135 may employ one or more rules to test the presence and/or format of data in each address field based on predefined acceptable formats, preferred data items (e.g., based on the destination), among other rules or any combination thereof for identifying errors and/or possibilities for enriching the address field(s). For example, an intermediary ID may be represented in a unique alpha-numeric code having, e.g., 5, 6, 7, 8, 9, 10, 11, 12 or more characters, and thus may be erroneous if the intermediary ID includes to many or too few letters and/or numbers. In another example, an intermediary ID may be represented in a unique alpha-numeric code having a predefined pattern of letters combined with numbers, and/or a selection of possible multi-letter symbols (e.g., abbreviations), among other formats signifying and identification of the intermediate. In some embodiments, the intermediary ID, destination ID or routing number may be left blank. Other errors relative to acceptable formats, values, fields, letters, etc. may thus be identified using a set of rules that define the acceptable formats, values, fields, letters, etc.

In some embodiments, the electronic request message may have an intended routing path according to the message instruction parameters including one or more routing hops as represented by one or more routing code fields of the electronic request message, including e.g., the intermediary ID. In some embodiments, the electronic request message may also have an intended destination represented by the destination ID, which may be encoded in a destination code field of the electronic request message. In some embodiments, an error may include an incorrect format in one or more of the routing hops based on the destination code field. For example, the destination code field may specify a destination on the external network, having a format that conforms to the network 100 but where the destination is on the external network 200. In order to successfully route the electronic request message to the external system 210 via the external network, the routing code field(s) may be populated with routing information in a format that conforms to the format of the external network 200. Thus, based on the destination ID, the error correction engine 145 may determine the ID of the destination as represented in the format of the external network 200. Upon determining the destination ID in the format of the external network 200, the error correction engine 145 may populate the routing code field(s) and/or destination code field with the destination ID in the format of the external network 200. As a result, the electronic request message may be modified so as to allow the electronic request message to be accurately and efficiently routed between networks to the destination on the external network 200 via the correction of errors, enriching of addressing information, modifications to addresses, among other modifications or any combination thereof.

In some embodiments, the examples of rules for an electronic request message (see, Table 1 below for an example electronic request message), such as an API request, may include using the destination ID to correct and/or populate routing data (e.g., a routing code, routing address, or other) and/or an intermediary ID. In such examples, situation (1) may be that the routing data and/or the intermediary ID may both be blank or in an incorrect format, situation (2) may be that both may be populated with values in the correct format, or situation (3) may be that one may be blank/incorrect and one correct. In some embodiments, the routing data may determine the address or network location to which the electronic request message is sent. Thus, in the case of situation (1) and/or situation (3) where the routing data is blank/incorrect, the error correction engine 145 may use the destination ID to query the dynamic route map 112 and obtain a correct routing data to populate a field for the routing data. In situation (2) and/or situation (3) where the routing data is correct and populated, the electronic request message may go unaltered to preserve resources, even where the intermediary ID may be incorrect and/or blank.

TABLE 1

Illustrative Electronic Request Message

| RoutingCode | IntermediaryID | DestinationID | Payload |
|---|---|---|---|
| 123456789 | 829284773 | 8c8e9k3mj | [content data] |

In some embodiments, the error correction engine 145 may use the dynamic route map 112 stored in the mapping database 110. In some embodiments, the dynamic route map 112 may include routing data for each destination mapped to the associated IDs for each network (e.g., the network 100 and the external network 200, among other networks). Thus, a destination represented in a format of a particular network may be mapped to the destination represented in a format of another network using the dynamic route map 112.

In some embodiments, the dynamic route map 112 may be generated dynamically through automated network mapping and/or topology. Automated network mapping may include one or more specialized algorithms to discover all devices, addresses and/or entities connected to a network and the interconnecting infrastructure, chart their relationships, and create a dynamic, representation, e.g., the dynamic route map 112.

In some embodiments, the dynamic route map 112 may be generated by periodically and/or intermittently querying one or more address books of destinations. In some embodiments, the address book(s) may include an ID or address for each destination among other data associated with the destination, such as an entity name of an entity associated with the destination, contact information for the entity, a physical geolocation of the entity, among other data or any combination thereof. To build the dynamic route map 112 from the destination information of the address book(s), the entity platform 120A may reconcile all ID's and/or address associated with a particular destination, e.g., by determining entries in the address book(s) having similar data associated with the destination. In some embodiments, data entries may be matched according to a measure of similarity of individual or combinations of attributes represented in the data entries. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the destination to identify data of any two data entries as the same.

In some embodiments, the dynamic routing map 112 may be configured by an administrator via an administration device 154 in permissioned communication with the mapping database 110. Thus, an administrator may use an administrator portal to enter one or more credentials for accessing the mapping database 110. Upon entering authentic credentials, the administrator may be granted access to the mapping database 110 to configure the dynamic route map 112, including to specify mappings between IDs of different networks and formats for one or more destinations. In some embodiments, the administrator may use the administration portal via the administration device 154 to correct or otherwise update automatically generated dynamic route map 112 data, e.g., data generated as detailed above.

In some embodiments, based on the destination ID, the error correction engine 145 may query the dynamic route map 112 in the mapping database 110 to obtain the routing/destination ID associated with the external network 200. The mapping database 110 may return the associated ID and the error correction engine 145 may modify the electronic request message to insert the ID for correct routing. In some embodiments, the error correction engine 145 may insert the ID in the destination ID field to replace the destination ID with the correct formatting based on the network location of the destination. In some embodiments, the error correction engine 145 may insert the ID into the routing code field(s) so as to preserve the original destination ID while ensuring routing according to the error corrected network routing using the correct format of the ID.

In some embodiments, upon correcting the fields of the electronic request message with the accurate IDs for routing via the external network 200, the addressing engine 125 may provide the electronic request message to a message adapter 127. In some embodiments, the message adapter 127 may include one or more integrations with one or more messaging libraries to provide communication with message brokers and/or communication interfaces (e.g., an API, transmission interface, receiver interface, TCP/IP port, among other endpoints or any combination thereof). In some embodiments, the message adapter 127 may include one or more message queues configured to buffer and/or queue messages for streamed, timed and/or batched message transmissions.

In some embodiments, the message adapter 127 may be configured to communication with an external transmission interface 128 associated with communication to the external network 200.

In some embodiments, the external transmission interface 128 may utilize one or more software computing interface technologies, such as, e.g., Common Object Request Broker Architecture (CORBA), an application programming interface (API) and/or application binary interface (ABI), among others or any combination thereof. In some embodiments, an API and/or ABI defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation. In some embodiments, CORBA may normalize the method-call semantics between application objects residing either in the same address-space (application) or in remote address-spaces (same host, or remote host on a network).

In some embodiments, the external transmission interface 128 may utilize one or more hardware computing interface technologies, such as, e.g., Universal Serial Bus (USB), IEEE 1394 (FireWire), Ethernet, Thunderbolt™, Serial ATA (SATA) (including eSATA, SATAe, SATAp, etc.), among others or any suitable combination thereof.

In some embodiments, the message adapter 127 may buffer electronic request messages sent via an external transmission interface 128. The message adapter 127 may include first-in-first-out, batch, or other buffer ordering scheme or any combination there. Accordingly, the message adapter 127 may buffer the electronic request message and the provide the electronic request message to the external transmission interface 128 for transmission, at B2, of the corrected electronic request message 102 to the external network 200.

In some embodiments, the destination (e.g., the external system 210 on the external network 200) may verify delivery of the electronic request message 102 and/or a token delivery via the distributed crypto-ledger 124 of other distributed crypto-ledger, or any combination thereof. Thus, the distributed crypto-ledger 124 may track and verify the attribution to the entity platform 120A of assets and quantities thereof. Thus, moving the quantity of the asset into the first segregated data structure 123 and moving tokens from the cryptographic token store may verifiably and immutably transfer attribution of the quantity of the asset to the destination. Thus, security of the transfer of the quantity of the asset may be maintained and actual movement of the electronic request message 102 and the content data thereof may be moved from the first segregated data structure 123 to the destination. Accordingly, the first user may receive system confirmation, via the user device 152, of successful transfer of the electronic request message 101.

Figure 4:
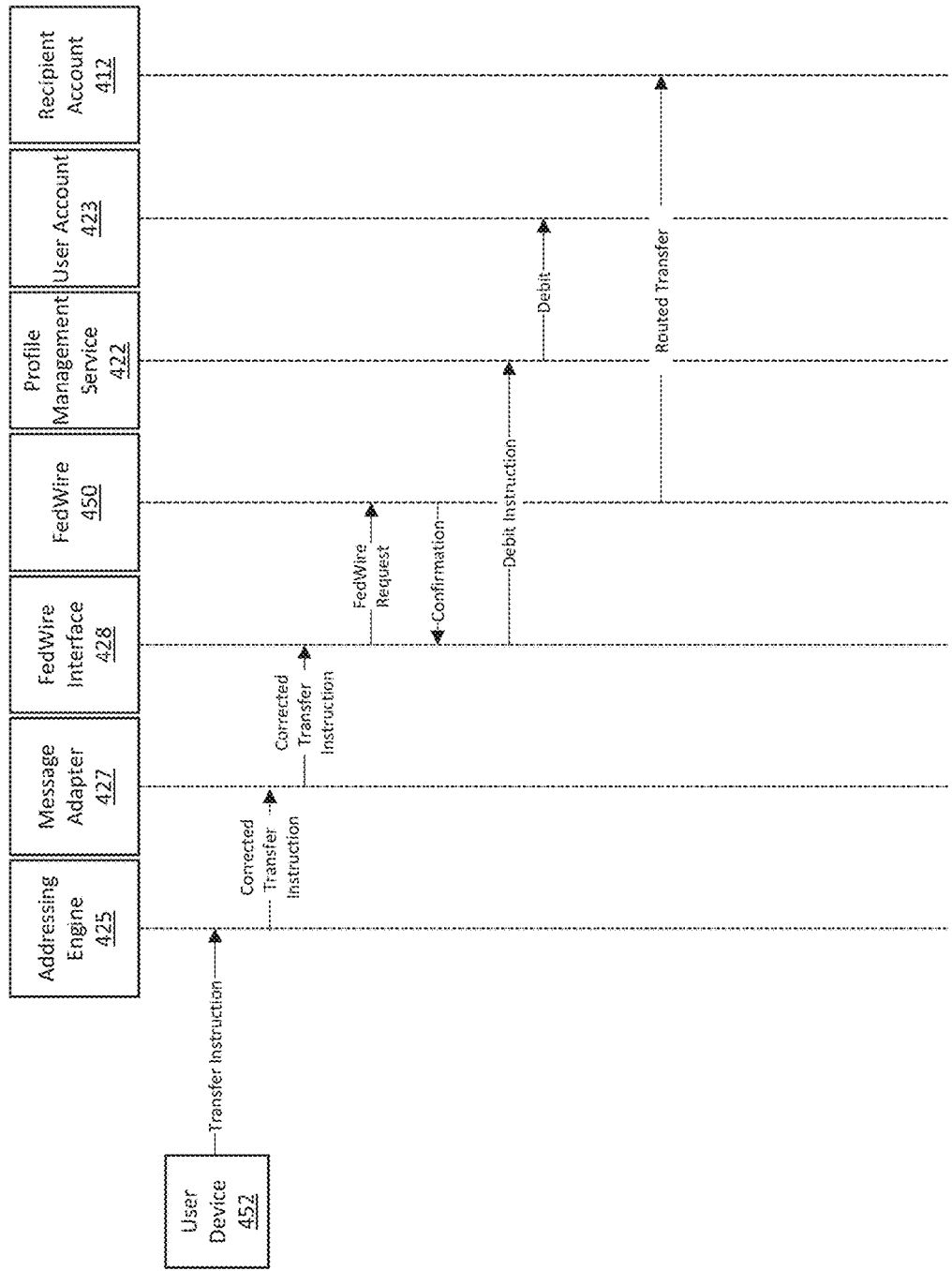
FIG. 4 depicts an illustrative transfer messaging architecture in the entity platform for dynamic message modification for reliable and secure electronic request messages to external network(s) in accordance with one or more embodiments of the present disclosure.

Referring now to FIG. 4, an illustrative transfer messaging architecture in the entity platform is depicted for dynamic message modification for reliable and secure electronic request messages to external network(s) in accordance with one or more embodiments of the present disclosure.

In some embodiments, an illustrative example of the entity platform 120A may include a financial transaction platform, such as a bank, payment service, blockchain platform, among other platforms or any combination thereof. In such an illustrative example, the user may select to send an electronic wire request including a transaction to another user on an external network 200 from a user account 423 to a recipient account 412.

Typically, banks or other financial entities construct a wire instruction to be sent to a bank with just a SWIFT or BIC ID code identifying the beneficiary, either because they do not know the ABA of the recipient bank or they just made a mistake in entering the wire request. However, the Fed does not process wire instructions with just Swift/BIC ID's. When a wire is sent into a vendor for the Fed, unless it has an ABA number (Fed Routing number), the wire is rejected.

In some embodiments, to avoid rejection of the wire, the entity platform 120A may implement the dynamic route map 112 to provide routing data mapped to financial entity IDs to perform error correction on wires having missing or incorrect beneficiary and/or routing data. Thus, the message adapter 427 may sent an electronic wire request (e.g., an API wire request) enriched with the correct ABA. With that automatic correction to a wire instruction, the wire can then flow through unimpeded to the Fed for processing in real time, thus reducing error and increasing network performance and efficiency in federal wire requests via the federal wire network (FedWire) 500. Such improvements may enable larger batches of transactions to be sent, batches to be processed and executed faster, among other benefits, thus improving interbank settlement in addition to improving the speed, efficiency and error rates of individual federal wire requests.

In some embodiments, a user may desire to send an electronic transaction to a beneficiary. Accordingly, the user may employ a user device 452 to instruct an entity platform 120A to transmit the electronic transaction in an electronic transaction request to the beneficiary. To do so, the user device 452 may present a user interface having one or more user selectable options and/or user input fields that enable the user to input message instruction parameters define the message data and/or content data, including the beneficiary and/or the electronic transaction.

In some embodiments, the user interface may be associated with a user account 423 associated with the user. Accordingly, in some embodiments, a profile management service 422 may receive the message instruction parameters, from the user device 452, from the user account 423 or a combination thereof. In some embodiments, the message instruction triggers a profile management service 422 to initiate a distributed crypto-ledger-based messaging procedure, including a token instruction on a distributed crypto-ledger 124, and/or an external message transmission process B to transmit an electronic request message 102 to the Fedwire 450.

In some embodiments, the profile management service 422 may utilize a user account 423 to segregate the electronic transaction from the user account 423. Doing so may facilitate tokenization on the distributed crypto-ledger 124. In some embodiments, the electronic transaction may be tokenized prior to segregation in the user account 423.

In some embodiments, the first user may desire to send a message to a second user. Accordingly, the first user may initiate the message instruction at process A to initiate the message transmission by selecting and/or inputting, via a user interface of a user device 452, user defined parameters defining the message from the user account 423 of the first user to a beneficiary, e.g., on the Fedwire 450.

In some embodiments, the user device 152 may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, in response to the user input and/or selection, the user device 452 may communicate the user defined parameters, e.g., using key-value pairs, structured table or list or vector or array, or any combination thereof, to the entity platform 120A, to a separate application layer and/or application server, or to any other suitable computing system.

In some embodiments, the computing system may receive the user defined parameters and generate a message instruction having instruction parameters derived from the user-defined parameters, including, e.g., message data (e.g., a beneficiary address and/or routing data) and/or content data, such as a electronic transaction to be delivered. In some embodiments, the instruction parameters may include a sender network address and recipient network address associated with the entity platform 120A and the Fedwire 450, respectively. In some embodiments, the sender and recipient addresses may be for the entity platform 120A and the external system 210, respectively, and/or for the first user account 423 and a second segregated data structure.

In some embodiments, a distributed crypto-ledger 124 may receive the message instruction, including the message instruction parameters. In some embodiments, the message instruction and the message instruction parameters may be associated with an instruction to transfer the electronic transaction from the first user to the beneficiary (e.g., a second user associated with the Fedwire 450).

In some embodiments, based on the instruction parameters, the entity platform 120A, e.g., as instructed by the distributed crypto-ledger 124 and/or a controller of the entity platform 120A, may move the quantity of the asset of the transfer from the user account 423 to the first user account 423. In some embodiments, moving the quantity of the asset into the first user account 423 moves the quantity of the asset from a data structure associated with the user to a data structure associated with the distributed crypto-ledger 124. Thus, the quantity of the asset is segregated from the user of the entity platform 120A.

In some embodiments, the distributed crypto-ledger 124 may verify the presence of the quantity of the asset in the first user account 423 in order to ensure a transfer of a token representing a tokenization of the quantity of the asset may be performed across the distributed crypto-ledger 124. Moreover, because the first user account 423 is a node of the distributed crypto-ledger 124, the first user account 423 may verify the transfer instruction by verifying the quantity of the first asset, and trigger the distributed crypto-ledger 124 to generate, at step A2, a token instruction configured to cause a transfer of the electronic transaction from the user based on the message instruction parameters.

In some embodiments, the user profile 121 may be associated with a cryptographic token storage on the distributed crypto-ledger 124. In some embodiments, the token instruction may cause the distributed crypto-ledger 124 to move the tokens from the cryptographic token storage to a different cryptographic token storage, and/or to burn the tokens from the distributed crypto-ledger 124 in order to immutably record the transfer of the electronic transaction. In some embodiments, cryptographic token storage may include, e.g., a blockchain wallet, or any other suitable cryptographic storage location addressed on the distributed crypto-ledger 124.

In some embodiments, the operation may include a transfer of funds, such as, e.g., an internet message communication, an SMS/MMS/RCS message, a file transfer, an electronic financial transfer (e.g., a money wire via, e.g., ACH or FedWire, etc.), among other transfers. Accordingly, the entity platform 120A may use the distributed crypto-ledger 124 to perform parallel transfers of tokenizations of the data for secure, immutable, and real-time transfer between the entity platform 120A.

In some embodiments, the distributed crypto-ledger 124 allows users of a member entity to send confirmed real-time data to users of other member entities. The distributed crypto-ledger 124 may convey the data via a tokens or tokenized data representing the data between the member entities. For example, for payment operations, the distributed crypto-ledger 124 may use tokens representing currency, such as, e.g., any suitable crypto-tokens, including bitcoin, Ether, Dogecoin, a stablecoin, or other suitable crypto-token or any suitable combination thereof.

Upon transferring the tokens and/or tokenized data between the member entities, the transfer of the original data may be reconciled with the transfer of the tokens and/or tokenized data to verify the completion and integrity of the operation.

In some embodiments, where the operation is a financial monetary transfer, the transfer of the original data may include a physical and/or digital transfer of the currency. Reconciliation of the transfer of the tokens and/or tokenized data and the transfer of the currency may take the form of settlement via one or more traditional payment rails, e.g., via FedWire, SWIFT, ACH, etc. The traditional payment rails may be a slow, computationally expensive, and financially expensive such that each operation cannot be feasibly performed in real-time. Thus, distributed crypto-ledger 124 provides the real-time transfer which may then be settled after the fact with the transfer of the currency. Accordingly, the transfer of the currency may be performed at any suitable time after the real-time transfer of tokens representing the currency. As a result, currency transfers may be batched based on aggregated amounts between entities to consolidate many transfers into one operation over the network between the entity platform 120A.

In some embodiments, the distributed crypto-ledger 124 may convey payment instructions between member entities for currency settlement (e.g., US Dollar settlement, or other currency or combination of currencies) between member entities may be performed over FedWire or other suitable wiring service. In some embodiments, the distributed crypto-ledger 124 the distributed crypto-ledger 124 utilizes a private permissioned blockchain. In some embodiments, the distributed crypto-ledger 124 may issue payment instructions and may utilize tokens that include or do not include stablecoins. In some embodiments, the distributed crypto-ledger 124 permits permissioned self-executing programming objects, such as, e.g., smart contracts, and documentation to be attached to the instructions. In some embodiments, the distributed crypto-ledger 124 architecture allows third parties to develop permissioned applications (e.g., for vertical markets, healthcare, receivables, mortgages, trade) that benefit from utilizing the distributed crypto-ledger 124 infrastructure.

In some embodiments, the user may trigger a message instruction, such as a payment instruction, message instruction, data message instruction, etc. The message instruction may be originated through a member entity's core system (e.g., FIS, Fiserv), or through an approved and permissioned platform, including an approved and permissioned payments platform or other platform for performing transfers. In some embodiments, the profile management service 422 may generate the electronic transaction request according to the message instruction parameters of the message instruction and the content data associated therewith.

In some embodiments, the profile management service 422 may provide the message instruction parameters to an addressing engine 425. In some embodiments, the addressing engine 425 may structure and address an electronic transaction request based on the message instruction parameters. As detailed above, the message instruction parameters may specify message data and/or content data associated with an electronic transaction request to be sent. In some embodiments, the message data may include addressing data, including an address associated with a beneficiary of the electronic transaction request. Where the beneficiary is on the Fedwire 450, the associated addressing data may use a different addressing scheme than the addressing scheme associated with the financial entity of the user. Accordingly, the addressing data may include erroneous information.

To resolve erroneous addressing data, the addressing engine 425 may employ an error detection engine (e.g., the error detection engine 135). In some embodiments, the structure of the electronic transaction request may include one or more address fields, such as, e.g., a routing number, an intermediary identifier (ID), a beneficiary ID, among others or any combination thereof. In some embodiments, the error detection engine may employ one or more rules to test the presence and/or format of data in each address field based on predefined acceptable formats. For example, the Fedwire 450 may use routing codes and/or intermediary IDs represented in a unique alpha-numeric code conforming to the ABA code scheme, and thus may be erroneous if the routing codes and/or intermediary ID includes a Swift and/or BIC identifier. In some embodiments, the intermediary ID, beneficiary ID or routing number may be left blank.

In some embodiments, the electronic transaction request may have an intended routing path to the beneficiary using Fedwire 450 according to the message instruction parameters including one or more routing hops as represented by one or more routing code fields of the electronic transaction request, including e.g., the intermediary ID. In some embodiments, the electronic transaction request may also have an intended beneficiary represented by the beneficiary ID, which may be encoded in a beneficiary code field of the electronic transaction request. In some embodiments, an error may include an incorrect format in one or more of the routing hops based on the beneficiary code field. For example, the beneficiary code field may specify a beneficiary addressable via the Fedwire 450. In order to successfully route the electronic wire request to the Fedwire 450, the routing code field(s) may be populated with routing information in a format that conforms to the format of the Fedwire 450, e.g., as an ABA code. Thus, based on the beneficiary ID, the error correction engine may determine the ID of the beneficiary as represented in the format of the Fedwire 450. Upon determining the beneficiary ID in the format of the Fedwire 450, the error correction engine may populate the routing code field(s) and/or beneficiary code field with the beneficiary ID in the format of the Fedwire 450. As a result, the electronic transaction request may be modified so as to allow the electronic transaction request to be accurately routed between networks to the beneficiary on the Fedwire 450.

In some embodiments, the examples of rules for an electronic wire request via the Fedwire 450 electronic communication interface (see, Table 2 below for an example electronic wire request), such as an API request, may include using the beneficiary ID to correct and/or populate routing data (e.g., a routing code, routing address, or other) and/or an intermediary ID. In such examples, situation (1) may be that the routing data and/or the intermediary ID may both be blank or provided as a Swift/BIC code, situation (2) may be that both may be populated with values in the correct format (e.g., ABA), or situation (3) may be that one may be blank/incorrect and one correct. In some embodiments, the routing data may determine the address or network location to which the electronic wire request is sent. Thus, in the case of situation (1) and/or situation (3) where the routing data is blank/incorrect, the error correction engine may use the beneficiary ID to query the dynamic route map 112 and obtain a correct routing data (e.g., the corresponding ABA code for the beneficiary) to populate a field for the routing data. In situation (2) and/or situation (3) where the routing data is correct and populated, the electronic wire request may go unaltered to preserve resources, even where the intermediary ID may be incorrect and/or blank.

TABLE 1

Illustrative Electronic Wire Request

| Destination Swift ID | Country | Receiver Bank Name | ABA ID | Intermediary/ Swift |
|---|---|---|---|---|
| BOFTGB20 | United Kingdom | Bank of Trust | 123456789 | |
| UBOBGB40 | United Kingdom | United Bank of Boston | 987654321 | |
| KRISGB30 | United Kingdom | Kris Bank | 162738495 | |

In some embodiments, the error correction engine may use the dynamic route map 112 stored in the mapping database 110. In some embodiments, the dynamic route map 112 may include routing data for each beneficiary mapped to the associated IDs for each network (e.g., the financial platform associated with the user and the Fedwire 450, among other networks). Thus, a beneficiary represented in the Fedwire format (e.g., ABA) may be mapped to the beneficiary represented in a format of another network using the dynamic route map 112.

In some embodiments, based on the beneficiary ID, the error correction engine may query the dynamic route map 112 in the mapping database 110 to obtain the routing/ beneficiary ID associated with the Fedwire 450. The mapping database 110 may return the associated ID and the error correction engine may modify the electronic Fedwire request to insert the ID for correct routing. In some embodiments, the error correction engine may insert the ID in the beneficiary ID field to replace the beneficiary ID with the correct formatting based on the network location of the beneficiary. In some embodiments, the error correction engine may insert the ID into the routing code field(s) so as to preserve the original beneficiary ID while ensuring routing according to the error corrected network routing using the correct format of the ID.

In some embodiments, upon correcting the fields of the electronic wire request with the accurate IDs for routing via the Fedwire 450, the addressing engine 425 may provide the electronic wire request to a message adapter 427. In some embodiments, the message adapter 427 may include one or more integrations with one or more messaging libraries associated with Fedwire 450 to provide communication with message brokers and/or communication interfaces (e.g., an API, transmission interface, receiver interface, TCP/IP port, among other endpoints or any combination thereof). In some embodiments, the message adapter 427 may include one or more message queues configured to buffer and/or queue messages for streamed, timed and/or batched message transmissions.

In some embodiments, the message adapter 427 may be configured to communication with a Fedwire interface 428 associated with communication to the Fedwire 450. In some embodiments, the Fedwire interface 428 may utilize one or more software computing interface technologies, such as, e.g., Common Object Request Broker Architecture (CORBA), an application programming interface (API) and/or application binary interface (ABI), among others or any combination thereof. In some embodiments, an API and/or ABI defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation. In some embodiments, CORBA may normalize the method-call semantics between application objects residing either in the same address-space (application) or in remote address-spaces (same host, or remote host on a network).

In some embodiments, the Fedwire interface 428 may utilize one or more hardware computing interface technologies, such as, e.g., Universal Serial Bus (USB), IEEE 1394 (FireWire), Ethernet, Thunderbolt™, Serial ATA (SATA) (including eSATA, SATAe, SATAp, etc.), among others or any suitable combination thereof.

In some embodiments, the message adapter 427 may buffer electronic wire requests sent via an Fedwire interface 428. The message adapter 427 may include first-in-first-out, batch, or other buffer ordering scheme or any combination there. Accordingly, the message adapter 427 may buffer the electronic wire request and the provide the electronic wire request to the Fedwire interface 428 for transmission, at B2, of the corrected electronic request message 102 to the Fedwire 450.

In some embodiments, the beneficiary (e.g., the external system 210 on the Fedwire 450) may verify delivery of the electronic request message 102 and/or a token delivery via the distributed crypto-ledger 124 of other distributed crypto-ledger, or any combination thereof. Thus, the distributed crypto-ledger 124 may track and verify the attribution to the entity platform 120A of assets and quantities thereof. Thus, moving the quantity of the asset into the first user account 423 and moving tokens from the cryptographic token store may verifiably and immutably transfer attribution of the quantity of the asset to the beneficiary. Thus, security of the transfer of the quantity of the asset may be maintained and actual movement of the electronic request message 102 and the content data thereof may be moved from the first user account 423 to the beneficiary. Accordingly, the first user may receive system confirmation, via the user device 152, of successful transfer of the electronic request message 101.

Figure 5:
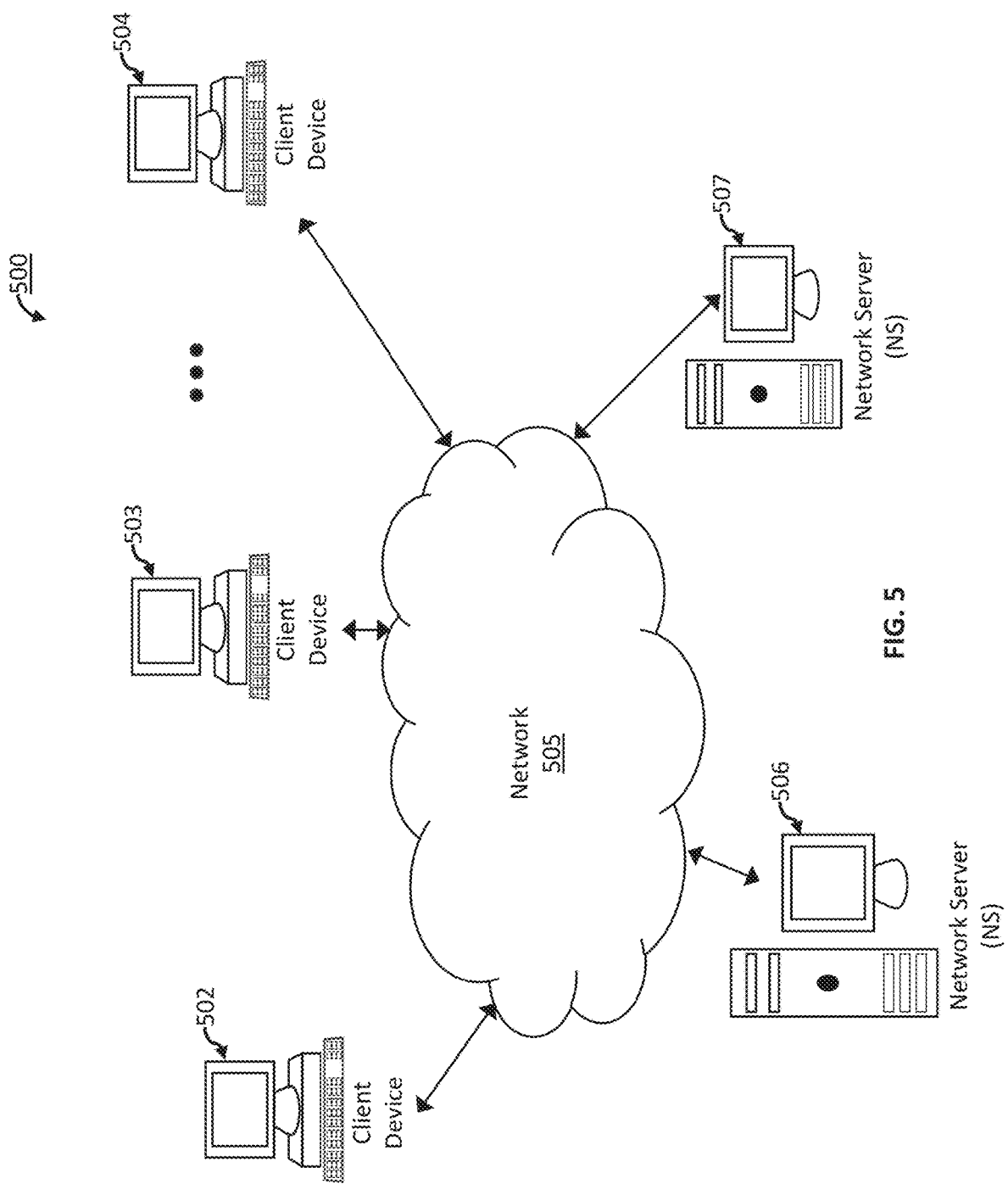
FIG. 5 depicts a block diagram of an exemplary computer-based system and platform for dynamic message modification in accordance with one or more embodiments of the present disclosure.

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, client device 502, client device 503 through client device 504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the client devices 502 through 504 may be personal computers, multiprocessor systems, microprocessor-based or programmable consumer electronics, network PCs, and the like. In some embodiments, one or more client devices within client devices 502 through 504 may include computing devices that typically connect using a wireless communications medium such as cell phones, smart phones, pagers, walkie talkies, radio frequency (RF) devices, infrared (IR) devices, C-Bs citizens band radio, integrated devices combining one or more of the preceding devices, or virtually any mobile computing device, and the like. In some embodiments, one or more client devices within client devices 502 through 504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 502 through 504 may include may run one or more applications, such as Internet browsers, mobile applications, voice calls, video games, videoconferencing, and email, among others. In some embodiments, one or more client devices within client devices 502 through 504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 502 through 504 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 502 through 504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Apache on Linux or Microsoft IIS (Internet Information Services). In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 501 through 504.

In some embodiments and, optionally, in combination of any embodiment described above or below, for example, one or more exemplary computing client devices 502 through 504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 6:
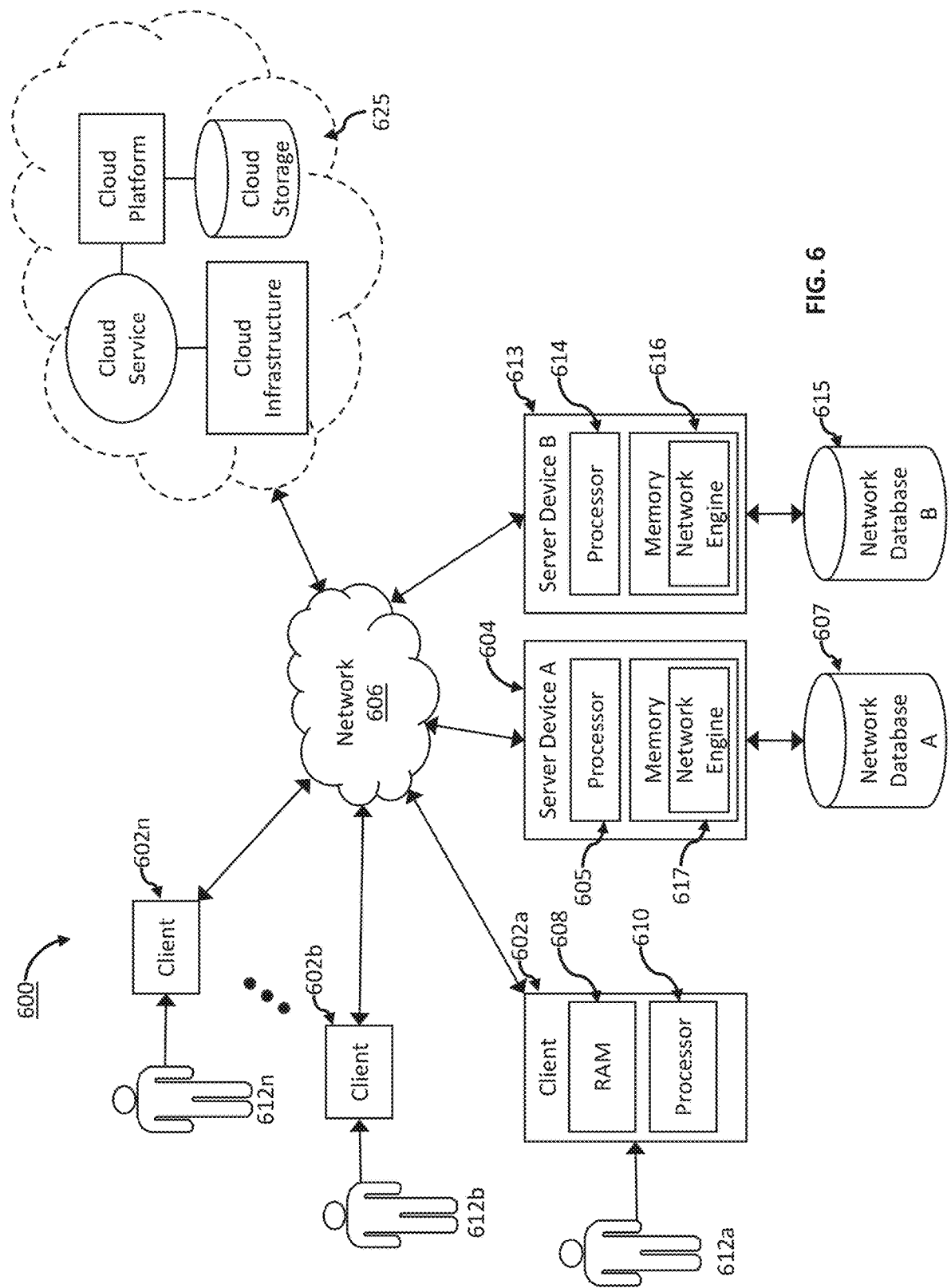
FIG. 6 depicts a block diagram of another exemplary computer-based system and platform for dynamic message modification in accordance with one or more embodiments of the present disclosure.

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client device 602a, client device 602b through client device 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client device 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 602a through 602n may also comprise a number of external or internal devices such as a mouse, a CD-ROM, DVD, a physical or virtual keyboard, a display, or other input or output devices. In some embodiments, examples of client devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, client devices 602a through 602n may be specifically programmed with one or more application programs in accordance with one or more principles/methodologies detailed herein. In some embodiments, client devices 602a through 602n may operate on any operating system capable of supporting a browser or browser-enabled application, such as Microsoft™, Windows™, and/or Linux. In some embodiments, client devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, user 612a, user 612b through user 612n, may communicate over the exemplary network 606 with each other and/or with other systems and/or devices coupled to the network 606. As shown in FIG. 6, exemplary server devices 604 and 613 may include processor 605 and processor 614, respectively, as well as memory 617 and memory 616, respectively. In some embodiments, the server devices 604 and 613 may be also coupled to the network 606. In some embodiments, one or more client devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
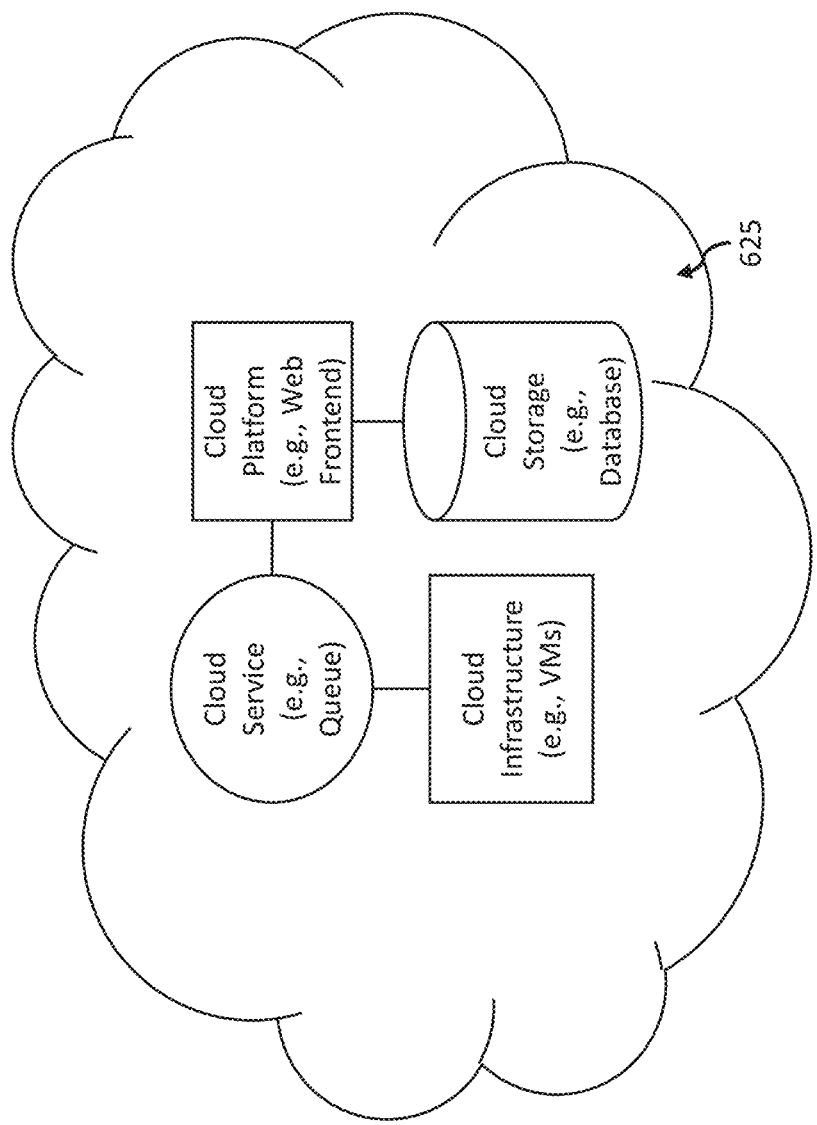
FIG. 7 depicts illustrative schematics of an exemplary implementation of the cloud computing/architecture(s) in which embodiments of a system for dynamic message modification may be specifically configured to operate in accordance with some embodiments of the present disclosure.
Figure 8:
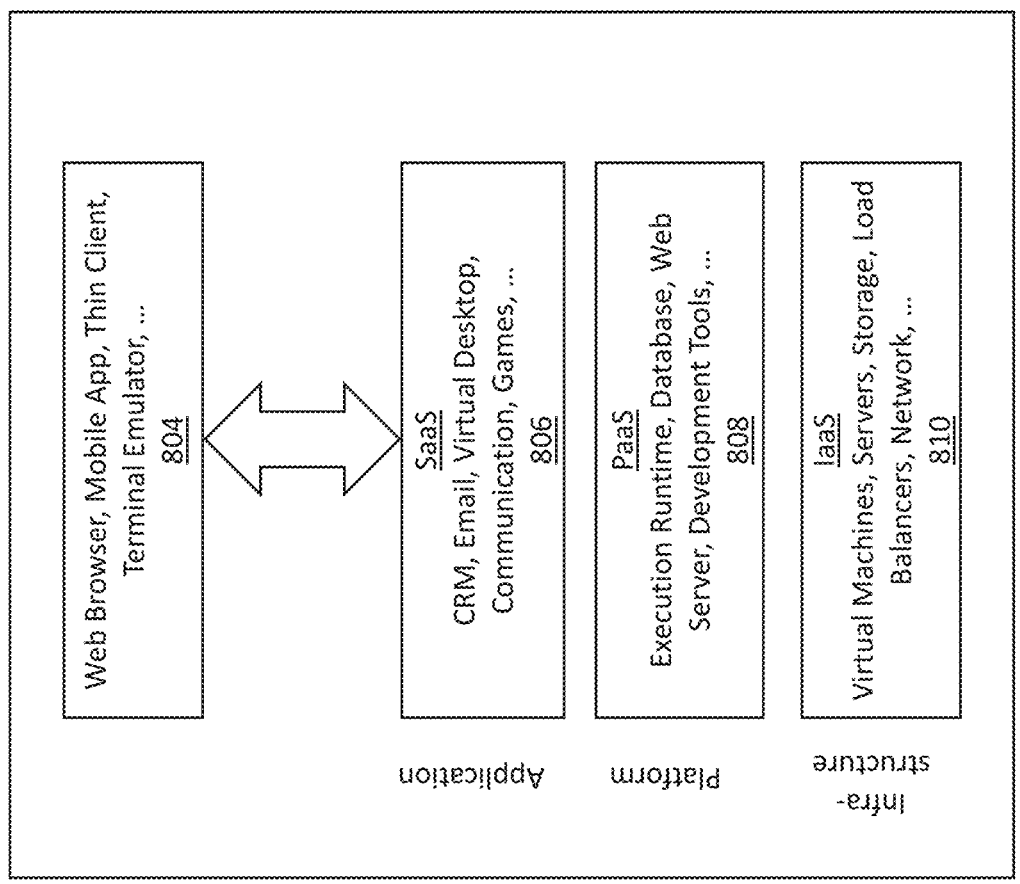
FIG. 8 depicts illustrative schematics of another exemplary implementation of the cloud computing/architecture(s) in which embodiments of a system for dynamic message modification may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator or other endpoint 804. FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A system comprising: receiving, by at least one processor, at least one electronic request message; wherein the at least one electronic request message comprises: at least one routing code field having at least one routing code field content defining at least one portion of a routing path of the at least one electronic request message and at least one destination code field having at least one destination code field content defining at least one destination of the at least one electronic request message; determining, by the at least one processor, that at least one first network protocol destination code in the at least one destination code field content conforms to a first network protocol associated with a first network; accessing, by the at least one processor, a dynamic route map stored in a mapping database; wherein the dynamic route map comprises a mapping of destination codes between the first network protocol and a second network protocol; determining, by the at least one processor, at least one second network protocol destination code associated with the at least one first network protocol destination code based at least in part on the dynamic route map and the at least one first network protocol destination code; wherein the at least one second network protocol destination code conforms to the second network protocol of the second network to define the at least one destination of the at least one electronic request message; modifying, by the at least one processor, the at least one routing code field content of the at least one routing code field of the at least one electronic request message to comprise the at least one second network protocol destination code; and routing, by the at least one processor, the at least one electronic request message according to the at least one second network protocol destination code in the at least one routing code field content of the at least one routing code field.

Clause 2. The method of clause 1, further comprising: automatically mapping, by the at least one processor, destination codes for each destination across at least one of the first network and the second network; and updating, by the at least one processor, the dynamic network map based at least in part on the mapping of the destination codes.

Clause 3. The method of clause 1, further comprising: determining, by the at least one processor, the at least one first network protocol destination code associated with a first entity name; determining, by the at least one processor, the at least one second network protocol destination code associated with a second entity name; determining, by the at least one processor, that the first entity name and the second entity name match; and generating, by the at least one processor, in the dynamic route map, a mapping between the at least one first network protocol destination code and the at least one second network protocol destination code.

Clause 4. The method of clause 3, further comprising: determining, by the at least one processor, utilizing at least one similarity measure, a similarity measurement between the first entity name and the second entity name; determining, by the at least one processor, that the similarity measurement exceeds a predetermined threshold; and determining, by the at least one processor, based on the similarity measurement exceeding the predetermined threshold, that the first entity name and the second entity name match.

Clause 5. The method of clause 1, further comprising: executing, by the at least one processor, at least one blockchain transaction on a blockchain between a first user and a second user; wherein the at least one blockchain transaction comprises at least one blockchain parameter; generating, by the at least one processor, the at least one electronic request message based at least in part on the at least one blockchain parameters.

Clause 6. The method of clause 5, wherein the at least one electronic request message comprises at least one electronic transaction request configured to cause at least one transaction corresponding to the at least one blockchain transaction.

Clause 7. The method of clause 6, wherein the at least one electronic transaction request comprises at least one electronic wire request configured to execute, via Fedwire, the at least one transaction.

Clause 8. The method of clause 1, wherein the second network protocol comprises ABA and the second network comprises Fedwire.

Clause 9. The method of clause 1, wherein the first network protocol comprises at least one of a Swift routing number or a BIC routing number or both and the second network comprises at least one of Swift or BIC or both.

Clause 10. The method of clause 1, wherein the at least one electronic request message comprises at least one interbank settlement request message.

Clause 11. A system comprising: at least one processor configured to: receive at least one electronic request message; wherein the at least one electronic request message comprises: at least one routing code field having at least one routing code field content defining at least one portion of a routing path of the at least one electronic request message and at least one destination code field having at least one destination code field content defining at least one destination of the at least one electronic request message; determine that at least one first network protocol destination code in the at least one destination code field content conforms to a first network protocol associated with a first network; access a dynamic route map stored in a mapping database; wherein the dynamic route map comprises a mapping of destination codes between the first network protocol and a second network protocol; determine at least one second network protocol destination code associated with the at least one first network protocol destination code based at least in part on the dynamic route map and the at least one first network protocol destination code; wherein the at least one second network protocol destination code conforms to the second network protocol of the second network to define the at least one destination of the at least one electronic request message; modify the at least one routing code field content of the at least one routing code field of the at least one electronic request message to comprise the at least one second network protocol destination code; and route the at least one electronic request message according to the at least one second network protocol destination code in the at least one routing code field content of the at least one routing code field.

Clause 12. The system of clause 11, wherein the at least one processor is further configured to: automatically map destination codes for each destination across at least one of the first network and the second network; and update the dynamic network map based at least in part on the mapping of the destination codes.

Clause 13. The system of clause 11, wherein the at least one processor is further configured to: determine the at least one first network protocol destination code associated with a first entity name; determine the at least one second network protocol destination code associated with a second entity name; determine that the first entity name and the second entity name match; and generate in the dynamic route map, a mapping between the at least one first network protocol destination code and the at least one second network protocol destination code.

Clause 14. The system of clause 13, wherein the at least one processor is further configured to: determine utilizing at least one similarity measure, a similarity measurement between the first entity name and the second entity name; determine that the similarity measurement exceeds a predetermined threshold; and determine based on the similarity measurement exceeding the predetermined threshold, that the first entity name and the second entity name match.

Clause 15. The system of clause 11, wherein the at least one processor is further configured to: execute at least one blockchain transaction on a blockchain between a first user and a second user; wherein the at least one blockchain transaction comprises at least one blockchain parameter; generate the at least one electronic request message based at least in part on the at least one blockchain parameters.

Clause 16. The system of clause 15, wherein the at least one electronic request message comprises at least one electronic transaction request configured to cause at least one transaction corresponding to the at least one blockchain transaction.

Clause 17. The system of clause 16, wherein the at least one electronic transaction request comprises at least one electronic wire request configured to execute, via Fedwire, the at least one transaction.

Clause 18. The system of clause 11, wherein the second network protocol comprises ABA and the second network comprises Fedwire.

Clause 19. The system of clause 11, wherein the first network protocol comprises at least one of a Swift routing number or a BIC routing number or both and the second network comprises at least one of Swift or BIC or both.

Clause 20. The system of clause 11, wherein the at least one electronic request message comprises at least one interbank settlement request message.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
   receiving, by at least one processor, at least one electronic request message;
      wherein the at least one electronic request message comprises:
         at least one routing code field having at least one routing code field content defining at least one portion of a routing path of the at least one electronic request message and
         at least one destination code field having at least one destination code field content defining at least one destination of the at least one electronic request message;
         determining, by the at least one processor, that at least one first network protocol destination code in the at least one destination code field content conforms to a first network protocol associated with a first network;
   accessing, by the at least one processor, a dynamic route map stored in a mapping database;
      wherein the dynamic route map comprises a mapping of destination codes between the first network protocol and a second network protocol;
   determining, by the at least one processor, at least one second network protocol destination code associated with the at least one first network protocol destination code based at least in part on the dynamic route map and the at least one first network protocol destination code;
      wherein the at least one second network protocol destination code conforms to the second network protocol of the second network to define the at least one destination of the at least one electronic request message;
   modifying, by the at least one processor, the at least one routing code field content of the at least one routing code field of the at least one electronic request message to comprise the at least one second network protocol destination code; and
   routing, by the at least one processor, the at least one electronic request message according to the at least one second network protocol destination code in the at least one routing code field content of the at least one routing code field.

2. The method of claim 1, further comprising:
   executing, by the at least one processor, at least one blockchain transaction on a blockchain between a first user and a second user;
      wherein the at least one blockchain transaction comprises at least one blockchain parameter;
   generating, by the at least one processor, the at least one electronic request message based at least in part on the at least one blockchain parameters.

3. The method of claim 2, wherein the at least one electronic request message comprises at least one electronic transaction request configured to cause at least one transaction corresponding to the at least one blockchain transaction.

4. The method of claim 3, wherein the at least one electronic transaction request comprises at least one electronic wire request configured to execute, via Fedwire, the at least one transaction.

5. The method of claim 1, further comprising:
   determining, by the at least one processor, the at least one first network protocol destination code associated with a first entity name;
   determining, by the at least one processor, the at least one second network protocol destination code associated with a second entity name;
   determining, by the at least one processor, that the first entity name and the second entity name match; and
   generating, by the at least one processor, in the dynamic route map, a mapping between the at least one first network protocol destination code and the at least one second network protocol destination code.

6. The method of claim 5, further comprising:
   determining, by the at least one processor, utilizing at least one similarity measure, a similarity measurement between the first entity name and the second entity name;
   determining, by the at least one processor, that the similarity measurement exceeds a predetermined threshold; and
   determining, by the at least one processor, based on the similarity measurement exceeding the predetermined threshold, that the first entity name and the second entity name match.

7. The method of claim 1, further comprising:
   automatically mapping, by the at least one processor, destination codes for each destination across at least one of the first network and the second network; and
   updating, by the at least one processor, the dynamic network map based at least in part on the mapping of the destination codes.

8. The method of claim 1, wherein the second network protocol comprises ABA and the second network comprises Fedwire.

9. The method of claim 1, wherein the first network protocol comprises at least one of a Swift routing number or a BIC routing number or both and the second network comprises at least one of Swift or BIC or both.

10. The method of claim 1, wherein the at least one electronic request message comprises at least one interbank settlement request message.

11. A system comprising:
at least one processor configured to:
receive at least one electronic request message;
  wherein the at least one electronic request message comprises:
    at least one routing code field having at least one routing code field content defining at least one portion of a routing path of the at least one electronic request message and at least one destination code field having at least one destination code field content defining at least one destination of the at least one electronic request message;
    determine that at least one first network protocol destination code in the at least one destination code field content conforms to a first network protocol associated with a first network;
access a dynamic route map stored in a mapping database;
  wherein the dynamic route map comprises a mapping of destination codes between the first network protocol and a second network protocol;
determine at least one second network protocol destination code associated with the at least one first network protocol destination code based at least in part on the dynamic route map and the at least one first network protocol destination code;
  wherein the at least one second network protocol destination code conforms to the second network protocol of the second network to define the at least one destination of the at least one electronic request message;
modify the at least one routing code field content of the at least one routing code field of the at least one electronic request message to comprise the at least one second network protocol destination code; and
route the at least one electronic request message according to the at least one second network protocol destination code in the at least one routing code field content of the at least one routing code field.

12. The system of claim 11, wherein the at least one processor is further configured to:
execute at least one blockchain transaction on a blockchain between a first user and a second user;
  wherein the at least one blockchain transaction comprises at least one blockchain parameter;
generate the at least one electronic request message based at least in part on the at least one blockchain parameters.

13. The system of claim 12, wherein the at least one electronic request message comprises at least one electronic transaction request configured to cause at least one transaction corresponding to the at least one blockchain transaction.

14. The system of claim 12, wherein the at least one electronic transaction request comprises at least one electronic wire request configured to execute, via Fedwire, the at least one transaction.

15. The system of claim 11, wherein the at least one processor is further configured to:
determine the at least one first network protocol destination code associated with a first entity name;
determine the at least one second network protocol destination code associated with a second entity name;
determine that the first entity name and the second entity name match; and
generate in the dynamic route map, a mapping between the at least one first network protocol destination code and the at least one second network protocol destination code.

16. The system of claim 15, wherein the at least one processor is further configured to:
determine utilizing at least one similarity measure, a similarity measurement between the first entity name and the second entity name;
determine that the similarity measurement exceeds a predetermined threshold; and
determine based on the similarity measurement exceeding the predetermined threshold, that the first entity name and the second entity name match.

17. The system of claim 11, wherein the at least one processor is further configured to:
automatically map destination codes for each destination across at least one of the first network and the second network; and
update the dynamic network map based at least in part on the mapping of the destination codes.

18. The system of claim 11, wherein the second network protocol comprises ABA and the second network comprises Fedwire.

19. The system of claim 11, wherein the first network protocol comprises at least one of a Swift routing number or a BIC routing number or both and the second network comprises at least one of Swift or BIC or both.

20. The system of claim 11, wherein the at least one electronic request message comprises at least one interbank settlement request message.

\* \* \* \* \*